United States Patent [19]

Leung et al.

[11] 4,347,571

[45] Aug. 31, 1982

[54] INTEGRATED CLOSED LOOP ENGINE CONTROL

[75] Inventors: Chun-Keung Leung, Farmington; William R. Seitz, Royal Oak, both of Mich.

[73] Assignee: The Bendix Corporation, Southfield, Mich.

[21] Appl. No.: 187,393

[22] Filed: Sep. 15, 1980

Related U.S. Application Data

[63] Continuation of Ser. No. 904,138, May 8, 1978.

[51] Int. Cl.³ .................. F02B 3/08; F02D 5/02; F02M 51/00
[52] U.S. Cl. .................. 364/431.08; 123/435; 123/478; 123/487; 73/650; 431/66
[58] Field of Search .......... 364/431.03, 431.04, 364/431.08; 73/116, 117 R, 462, 650, 659; 123/415, 416, 425, 435, 436, 478, 486, 488, 492, 493

[56] References Cited

U.S. PATENT DOCUMENTS

| | | | |
|---|---|---|---|
| 3,923,022 | 12/1975 | Scholl | 123/415 |
| 4,009,697 | 3/1977 | Chateau | 364/431.04 X |
| 4,009,699 | 3/1977 | Hetzler et al. | 123/416 |
| 4,015,566 | 4/1977 | Wahl | 123/415 |
| 4,033,305 | 7/1977 | Maioglio et al. | 123/416 |
| 4,036,190 | 7/1977 | Bigliani et al. | 123/416 |
| 4,052,967 | 10/1977 | Colling et al. | 123/416 |
| 4,054,111 | 10/1977 | Sand | 123/425 |
| 4,055,995 | 11/1977 | Armstrong et al. | 73/116 |
| 4,064,747 | 12/1977 | Rackliffe et al. | 73/116 |
| 4,064,846 | 12/1977 | Latsch et al. | 123/483 X |
| 4,104,990 | 8/1978 | Frobenius | 123/436 |
| 4,112,879 | 9/1978 | Assenheimer et al. | 123/478 |
| 4,127,092 | 11/1978 | Fresow | 364/431.04 X |
| 4,161,162 | 7/1979 | Latsch et al. | 123/435 |
| 4,172,433 | 10/1979 | Bianchi et al. | 123/486 |

FOREIGN PATENT DOCUMENTS

1512213 5/1978 United Kingdom .
1520427 8/1978 United Kingdom .

OTHER PUBLICATIONS

Randall et al.: Closed Loop Control of Internal Combustion Engine Efficiency and Exhaust Emissions, Stanford University Report, DOT-OS-30111, May, 1976, pp. 29-34.

Primary Examiner—Felix D. Gruber
Attorney, Agent, or Firm—Russel C. Wells; Gaylord P. Haas, Jr.; James R. Ignatowski

[57] ABSTRACT

An integrated closed loop engine control is disclosed in which the fuel delivery and timing functions of the engine are closed about a measurement of the engine's instantaneous rotational velocity. Signals indicative of the profile of each torque impulse imparted to rotary output member of the engine from the burning of an air/fuel mix in the engine's combustion chambers are generated and electrically analyzed to detect perturbation caused by deviations of at least two different engine operational parameters from desired values. Feedback correction signals indicative of the magnitude of the detected perturbations are generated to correct the fuel delivery and timing functions of an engine control to minimize the difference between the actual operating parameters and the desired values. In an ultimate embodiment, the correction signals are applied to the engine control through a state variable matrix integrating the control of at least one engine parameter as a function of at least two different correction signals.

35 Claims, 2 Drawing Figures

INTEGRATED CLOSED LOOP ENGINE CONTROL

This is a continuation of application Ser. No. 904,138, filed May 8, 1978.

CROSS REFERENCE TO AND INCORPORATION OF RELATED CO-PENDING APPLICATIONS

This application is one of six applications originally filed on May 8, 1978 all commonly assigned and having substantially the same specification and drawings, the six applications being identified below:

| Parent Serial Number | Continuation Serial Number | Filing Date | Title |
| --- | --- | --- | --- |
| 904,131 | 187,400 | 9/15/80 | Closed Loop Timing and Fuel Distribution Control |
| 904,132 | 188,803 | 9/19/80 | Digital Roughness Sensor |
| 904,137 | 187,392 | 9/15/80 | Timing Optimization Control |
| 904,138 | 187,393 | 9/15/80 | Integrated Closed Loop Engine Control |
| 904,139 | 187,394 | 9/15/80 | Closed Loop Engine Roughness Control |

Application Ser. No. 904,129, now U.S. Pat. No. 4,197,767, which issued Apr. 15, 1980 and has been printed in its entirety, including FIGS. 1–56, and the specification of that patent is specifically incorporated herein by reference.

BACKGROUND OF THE INVENTION

1. Field of the Invention

The invention is related to engine controls and, in particular, to an integrated closed loop control in which more than one control loop is closed about the instantaneous rotational velocity of the engine's crankshaft.

2. PRIOR ART

Electronic ignition and fuel control systems for internal combustion engines are finding acceptance in the automotive and allied industries as rigid efficiency and pollution standards are imposed by the government. The first generation of these electronic controdls were open loop systems which became progressively complex as the standards were raised. The number of variables needed to be detected as well as auxiliary circuits for providing corrections for these variables increased with each raising of the standards. From the conception of electronic control systems for internal combustion engines, it has been known that if the control systems could be closed about the engine, simpler control systems could be developed. This would reduce the number of variables needed to be detected, reduce the complexity of the control systems, and at the same time improve the overall efficiency. The problem that has plagued the industry is the selection of an appropriate engine parameter about which to close the loop.

K. W. Randall and J. D. Powell from Stanford University in their research under a Department of Transportation sponsored project determined that for maximum efficiency of an internal combustion engine, the spark timing should be adjusted to provide a maximum cylinder pressure at a crankshaft angle 15 degrees past the piston's top dead center position. The results of this investigation are published in a Final Report NO SU-DAAR-503 entitled "Closed Loop Control of Internal Combustion Engine Efficiency and Exhaust Emission". The report contains a block diagram of a closed loop system in which a sensor detects the angle at which peak pressure occurs then compares this measured angle with the desired 15° angle. An error signal, generated when the measured angle differs from the desired angle, is used to correct the ignition timing signal generated in response to the other sensed engine parameters.

Comparable closed loop ignition control systems closed about the cylinder pressure are disclosed by M. M. Peterson in U.S. Pat. No. 3,957,023 entitled "Pressure Responsive Engine Ignition System" issued May 19, 1976 and Sand in U.S. Pat. No. 3,977,373 "Closed Loop Combustion Pressure Control" issued Aug. 31, 1976.

An alternate closed loop ignition control system taught by Pratt, Jr. et al in U.S. Pat. No. 3,897,766 entitled "Apparatus Adapted to Opto-Electrically Monitor the Output of a Prime Mover to Provide Signals which are Fed Back to the Input and Thereby Provide Control of the Prime Mover" issued Aug. 5, 1975 embodies a torque sensor which measures the twist in the output shaft of the prime mover to measure the torque. The measured torque and engine speed are used to close the loop about the engine.

Harned et al in U.S. Pat. No. 4,002,155 entitled "Engine and Engine Spark Timing Control with Knock Limiting, etc." issued Jan. 11, 1977 teaches a closed loop ignition system in which engine knock-induced vibrations are detected by an engine mounted accelerometer. The system counts the number of individual ringing vibrations that occur in a predetermined angular rotation of the crankshaft. When the number of ringing vibrations exceed a predetermined number, the engine spark timing is retarded and when the number of ring vibrations is less than a second predetermined number, the spark timing is advanced.

Wahl in U.S. Pat. No. 4,015,566 entitled "Electronic Ignition Control System for Internal Combustion Engines" issued Apr. 5, 1977 teaches a closed loop ignition timing system closed about an operational parameter of the engine. In his patent, Wahl teaches sensing the temperature of a catalytic converter, the exhause gas composition (especially NO compounds), or in the alternative using a vibration sensor to detect a rough running engine. The use of engine roughness as the measured parameter is similar to the system taught by Harned in U.S. Pat. No. 4,002,155 discussed above. In still another type of close loop system, Schweitzer et al in U.S. Pat. No. 4,026,251 entitled "Adaptive Control System for Power Producing Machines" issued May 31, 1977 teaches dithering the ignition timing and closing the loop about the engine's speed.

The closed loop ignition timing systems in which the cylinder pressure is measured directly as taught by Randall and Powell and implemented in the patents to Peterson and Sand appear as the most direct and effective engine parameter about which to close the loop. However, this method requires a pressure transducer to be incorporated into at least one of the engine's cylinders where it is exposed to high temperatures and high pressures. Such pressure sensors are costly, have relatively short life expectancies and require additional modification to the engine for their use. Alternatively, pressure sensors adapted to be used in conjunction with the spark plugs are known but still suffer from the first listed deficiencies. The direct measurement of engine torque as taught by Pratt, Jr. et al is an alternate approach but requires a relatively complex and expensive torque measuring sensor. The measurement of the onset of engine knock or roughness as taught by Harned et al and Wahl respectively are believed to be too inaccurate to meet today's standards while the system taught by Schweitzer is believed to be ineffective because factors other than ignition timing such as a change in load could affect the engine speed and result in inproper ignition timing.

Various types of closed loop fuel control systems for internal combustion engines have been developed in which the loop is closed about different engine parameters. The one of the parameters about which the loop is closed is the composition of the exhaust gas as taught by Seitz in U.S. Pat. No. 3,815,561 "Closed Loop Engine Control System" issued June 11, 1974 as well as many others. The system taught by Seitz uses an oxygen ($O_2$) sensor detecting the concentration of oxygen in the exhaust gas and closes the loop about a stoichiometric mixture of air and fuel. However, a stoichiometric mixture of air and fuel has been found to be too rich for the efficient operation of the engine. Various techniques have been employed to operate the engine at leaner air fuel ratios but the ability to achieve reliable closed loop control at the desired leaner mixture is limited by the characteristics of the present day oxygen sensors.

An alternate approach is taught by Taplin et al in U.S. Pat. No. 3,789,816 "Lean Limit Internal Combustion Engine Roughness Control System" issued Feb. 5, 1974 in which engine roughness is detected as the parameter about which the loop is closed. In this system, the air-fuel mixture is leaned out until a predetermined level of engine roughness is achived. The magnitude of engine roughness is selected to correspond with a level of engine roughness at which the air fuel mixture is made as lean as possible to the point that the formation of such exhaust gas as HC and CO is minimized without the drivability of the particular vehicle being unacceptable. Engine roughness as measured in the Taplin et al patent is the incremental change in the rotational velocity of the engine's output as a result of the individual torque impulses received from each of the engine's cylinders. The closing of the fuel control loop about engine roughness appears to be the most effective means for maximizing the fuel efficiency of the engine.

Leshner et al in U.S. Pat. No. 4,015,572 teaches a similar type of fuel control system in which the loop is closed about engine power. In their preferred embodiment, Leshner et al use exhaust back pressure as a manifestation of engine power, however, state that a measured torque, cylinder pressure, or a time integral of overall combustion pressure for one or more engine revolutions at a given RPM may be used in the alternative. In a more recent advertising brochure "Breaking the Lean Limit Barrier", Fuel Injection Development Corporation of Bellmawr, New Jersey, the assignee of the Leshner et al patent, states that the parameter measured is the velocity of the engine's flywheel.

In another type of fuel control system using engine roughness as the sensed parameter to close the loop, Bianchi et al in U.S. Pat. No. 4,044,236 teaches measuring the rotational periods of the crankshaft between two sequential revolutions of the engine. The differential is digitally measured in an up down counter counting at a frequency proportional to the engine speed.

In an alternate type of roughness closed loop fuel control system, Frobenius et al in U.S. Pat. No. 4,044,234 "Process and Apparatus for Controlling Engine Operation Near the Lean-Running Limit" issued August 1977, teaches measuring the rotational periods of two equal angular intervals, one before and one after the top dead center position of each piston. The change in the difference between the two rotational periods for the same cylinder is compared against a particular reference value and an error signal is generated when the change exceeds the reference value. Frobenius in U.S. Pat. No. 4,044,235 "Method and Apparatus For Determining Smooth Running Operation in an Internal Combustion Engine" issued August 1977 teaches an alternate roughness control system wherein the periods of three sequential revolutions are compared to determine engine smoothness. The above reflects various ways in which engine roughness as detected by various means including the variations in the rotational velocity of the flywheel is used to close the loop about the engine The prior art teaches independent closed loop control systems, in which each control, i.e., ignition timing, fuel control, and fuel distribution are treated as separate entities. The Applicants herein teach an integrated engine control system in which the control loops for each controlled parameter is closed about a single measured engine operating parameter and in particular, the instantaneous rotational velocity of the engine's crankshaft. The data obtained from the singularly measured parameter is processed in different ways to generate timing and fuel delivery correction signals optimizing the conversion of combustion energy to rotational torque by the engine.

SUMMARY OF THE INVENTION

The invention is a closed loop engine control closed about the characteristics of torque impulses imparted to engine's output shaft by the combustion of an air fuel mixture in the combustion chamber. The control detects the instantaneous rotational velocity of the output shaft and generates velocity profile signals for each torque impulse indicative of the instantaneous rotational velocity of the output shaft as a function of the shafts rotational angle. The velocity profile signals are processed to generate signals indicative of at least two selected characteristics of the torque impulse. Each of the selected characteristics varying in a known way with the deviation of at least one engine operating parameter of the engine from a desired value. Correction signals indicative of the deviations of the engine's operating parameters from the desired values are generated from the signals indicative of the selected torque impulse characteristics. The correction signals modify the fuel delivery and timing signals generated by an engine control minimizing the deviations of the selected engine operating parameters from the desired values. In the disclosed embodiment circuits are shown for extracting from the velocity profile signals, signals indicative of engine roughness, timing and torque from which are generated correction signals modifying the fuel delivery and timing signals controlling the operations of the engine.

One object of the invention is an integrated closed loop engine control in which the fuel delivery and timing functions are closed about a singularly measured engine output parameter.

Another object of the invention is a closed loop engine control in which fuel delivery and timing functions of the engine are closed about the instantaneous rotational velocity of the engines output shaft. Still another object of the invention is a closed loop engine control in which the information relating to more than one operational parameter of the engine is extracted from the profile of the torque impulses imparted to the engines output shaft. Yet another object is a closed loop engine control in which engine roughness, timing and the torque generated by each combustion chamber is extracted from the profile of the torque impulses. A final object is a closed loop engine control using a state variable matrix to close the loop about the engine.

These and other objects of the invention will become apparent from a reading of the specification in conjunction with the drawings.

Figure 13:
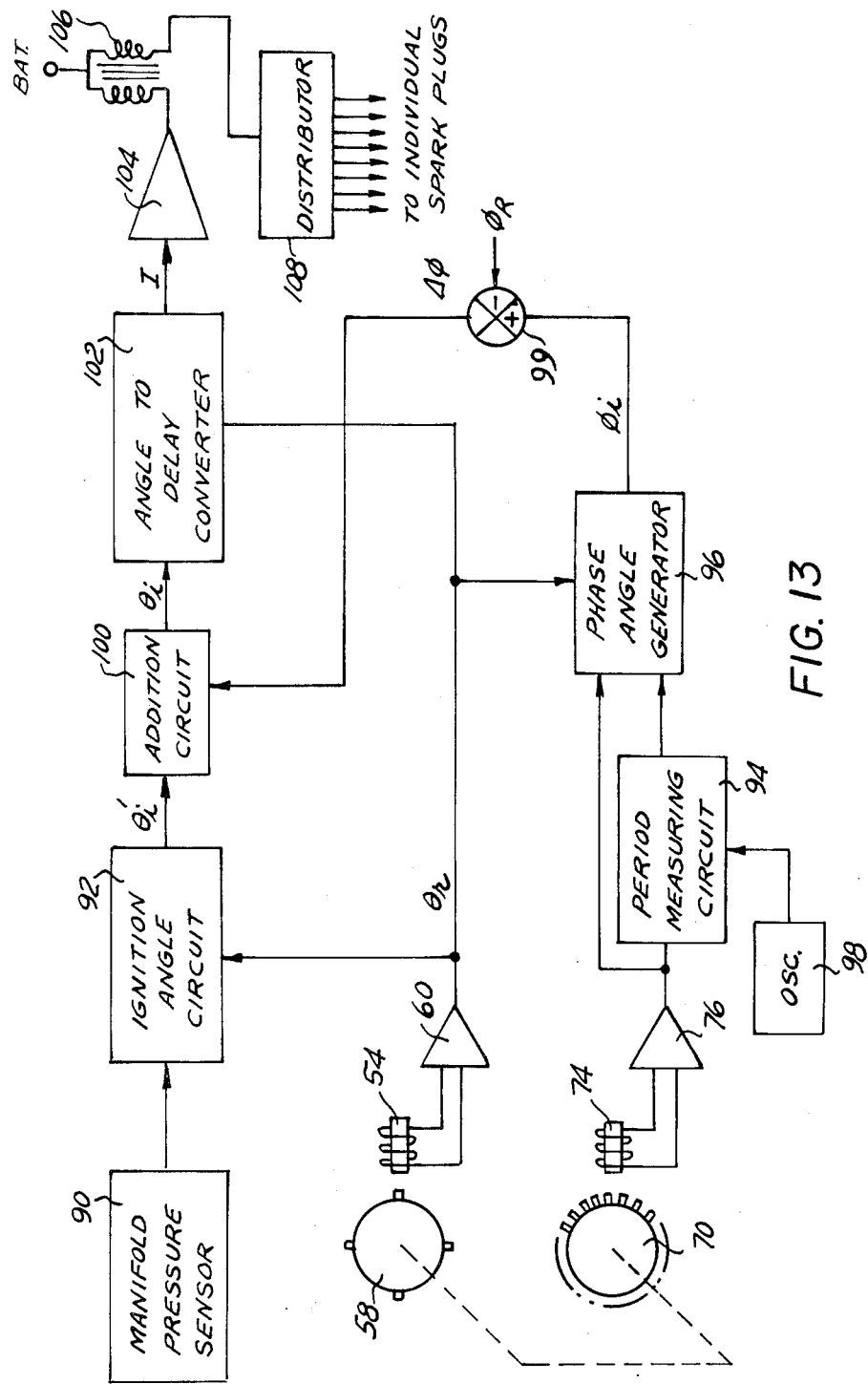
FIG. 13 is a block diagram of the preferred embodiment of the closed loop ignition control circuit.
Figure 15:
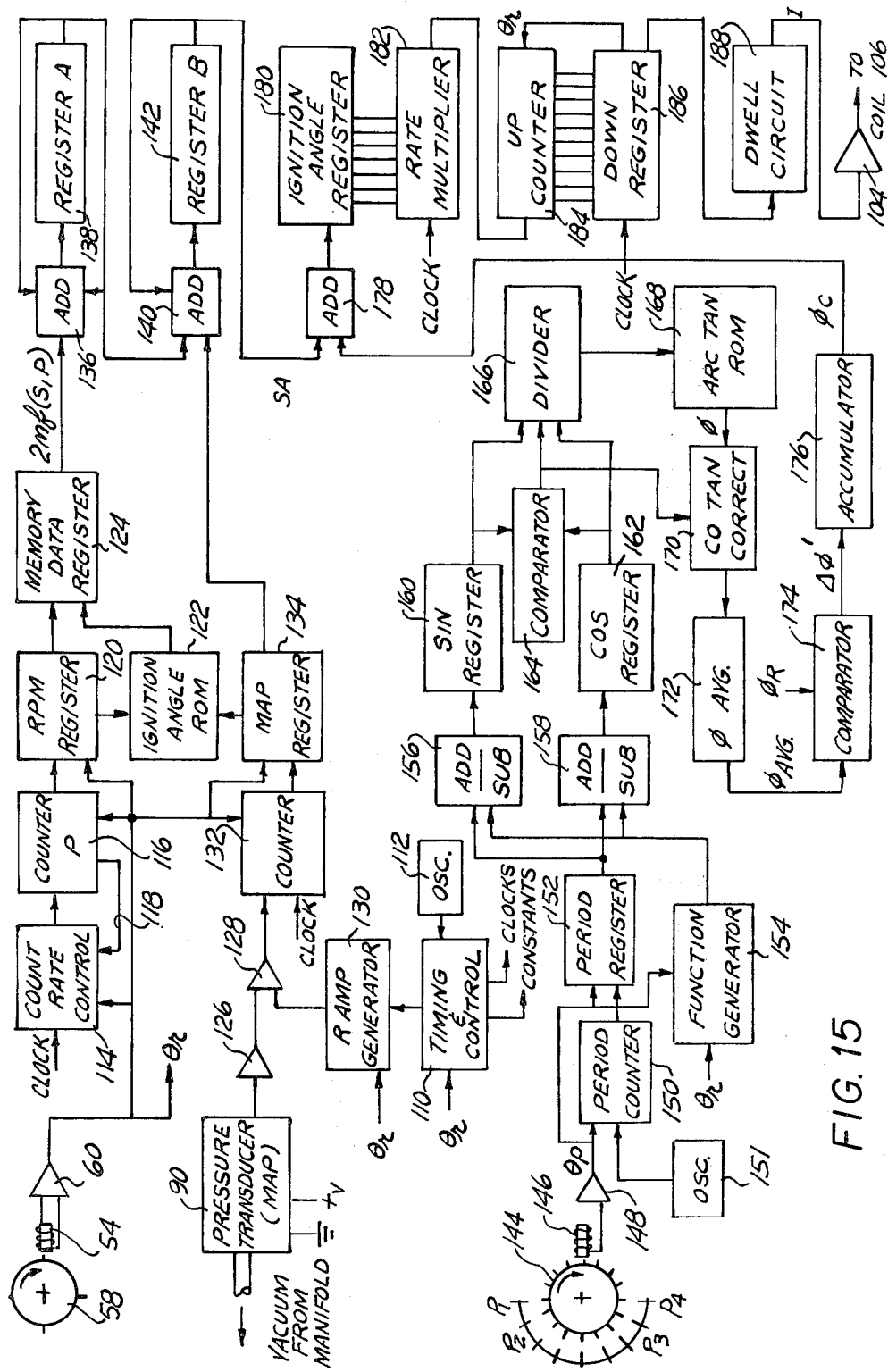
FIG. 15 is a more detailed block diagram of the preferred embodiment of FIG. 13.

For a better understanding of the drawing figures in this application, reference is made to the same figure numbers of the above referenced patent, U.S. Pat. No. 4,197,767.

We claim:

1. An engine control for an internal combustion engine having at least one combustion chamber, delivery means for delivering a combustible mixture of air and fuel to the at least one combustion chamber, and an output shaft receiving rotational torque impulses resulting from the combustion of the air/fuel mixture in said at least one combustion chamber, comprising:

means for generating reference signals indicative of at least one predetermined rotational position of the engine's output shaft having a predetermined relationship to said at least one combustion chamber;

means detecting the rotation of the output shaft for generating velocity profile signals for each received torque impulse indicative of the velocity of the output shaft as a function of the output shaft's rotational angle with respect to said reference signals;

means responsive to said profile signals for generating correction signals indicative of the magnitudes of at least two different deviations of the torque impulse profile signals from signals indicative of a desired torque impulse profile, each deviation caused by a departure of a different operational parameter from a desired value; and control means responsive to at least one other operational parameter of the engine and said correction signals to generate control signals activating said delivery means to deliver a combustible mixture of air and fuel to said at least one combustion chamber minimizing the departure of said at least two different operational parameters from said desired values.

2. The engine control of claim 1 wherein the output shaft rotates through a predetermined angular interval for each torque impulse, said means for generating reference signals is a digital period sensor generating said signals indicative of the output shaft's rotational velocity having a value indicative of the time required for the output shaft to rotate through at least two rotational increments within each of said predetermined angular intervals.

3. The engine control of claim 1 wherein said means for generating correction signals includes:

means for differentiating said profile signals to generate an angle signal indicative of the rotational angle of said output shaft with respect to said reference signals at which said torque impulse profile has an inflection point, the angle at which said inflection point occurs being characteristic of one of said at least two engine operating parameters;

means for generating a reference angle signal indicative of the desired angle at which said inflection point should occur for the desired operation of the engine; and means for comparing said angle signal with said reference angle signal to generate correction signals indicative of the difference between said angle signal and said reference signal for each torque impulse.

4. The engine control of claim 3 wherein said means for differentiating comprises:

subtraction means for generating a difference signal indicative of the difference between sequentially generated instantaneous velocity signals;

detector means for detecting a predetermined change in the value of sequentially generated difference signals to generating a hold signal;

means for storing in response to said hold signal the instantaneous angle signal corresponding to the rotation angle of the output shaft where the predetermined change was detected wherein said stored instantaneous angle signal is said angle signal.

5. The engine control of claim 4 wherein said detector means is a zero crossing detector.

6. The engine control of claim 3 wherein said means for differentiating includes a phase angle generator generating a phase angle signal indicative of the phase angle of each torque impulse with respect to said reference signals, wherein said phase angle is indicative of said angle signal.

7. The engine control of claim 3 wherein said means for generating correction signals further includes:

means comparing the profile signals generated from at least two different torque impulses for generating difference signals indicative of a deviation effected by the other of said at least two different operational parameters of the engine;

means for generating correction signals from said difference signals indicative of the deviations between said two torque impulse profiles characteristic of the other of said at least two operational parameter of the engine.

8. The engine control of claim 7 wherein means for generating difference signals generates difference signals indicative of the ratio of fuel to air received by said at least one combustion chamber, and said means for generating a correction signal, generates a correction signal indicative of a change in the quantity of fuel delivered to said at least one combustion chamber required to effect a predetermined deviation between the two torque impulse profiles.

9. The engine control of claim 8 wherein said engine has a plurality of combustion chambers, said means for generating difference signals compares the profile signals of at least two torque impulses generated by different combustion chambers to generate difference signals indicative of engine roughness.

10. The engine control of claim 8 wherein said engine has a plurality of combustion chambers, said means for generating difference signals compares the profile signals of torque impulses generated by the same combustion chamber.

11. The engine control of claim 7 wherein said means for generating correction signals further includes a state variable matrix means for combining the correction signals indicative of said at least two operational parameters to generate at least one of said correction signals having a value variable as a function of at least two different operational parameters of the engine.

12. The combination of claim 7 wherein said means for generating corrections signals further includes means for generating corrections signals indicative of the magnitude of a third deviation of said torque impulse profile different from said at least two perturbations wherein said third deviation is characteristic of a third operational parameter of the engine.

13. The engine control of claim 1 wherein said profile signals for each torque impulse is measured over a predetermined rotational interval of the output shaft, said means for generating profile signals comprises:
    angle encoder means detecting the rotation of said output shaft for generating angle increment signals indicative of equal angular increments of rotation of said output shaft, said angular increments smaller than said rotational intervals;
    means responsive to the relationship between said reference and angle increment signals for generating instantaneous angle signals indicative of the instantaneous rotational angle of the output shaft with respect to said reference signals;
    means for generating signals indicative of the instantaneous rotational velocity of the output shaft between said angle increment signals.

14. The engine control claim 13 wherein said means for generating instantaneous angle signals is a first counter generating a number indicative of the number of angle increment signals received after each reference signal wherein said number is indicative of the instantaneous rotational angle of the output shaft.

15. The engine control of claim 13 wherein said means for generating a signal indicative of the instantaneous rotational velocity of the output shaft comprises:
    an oscillator generating oscillator signals at a rate substantially higher than the rate at which said angle increment signals are generated; and
    a second counter for generating a number indicative of the oscillator signals received between angle increment signals.

16. The engine control of claim 13 wherein said engine includes a ring gear having a plurality of teeth disposed about its periphery at equal angular intervals, coupled to said output shaft, said angle encoder is a tooth detector generating a signal each time a tooth on the ring gear passes said tooth detector.

17. The engine control of claim 1 wherein the engine is a compression ignited engine, said control means generates control signals controlling the time at which the air/fuel mixture is delivered to said at least one combustion chamber modified by the correction signal indicative of said one operational parameter of the engine and controlling the ratio of fuel to air of the air/fuel mixture delivered to the at least one combustion chamber modified by the correction signals indicative of at least one other of said at least two operational parameters.

18. The engine control of claim 1 wherein the engine is a spark ignited engine having ignition means disposed in said at least one combustion chamber, said control means generates control signals controlling the time at which said ignition means is energized to ignite said air/fuel mixture modified by the correction signals indicative of said one engine operating parameters, and controlling the ratio of fuel to air delivered to the at least one combustion modified by the correction signals indicative of the other engine operating parameter.

19. The engine control of claim 17 or 18 wherein said means for generating correction signals further includes a state variable matrix combining the correction signals indicative of said at least two operational parameters to generate at least one of said correction signals having a value variable as a function of at least two different operational parameters of the engine.

20. A method for generating control signals controlling the operation of an internal combustion engine having at least one combustion chamber, delivery means for delivering a combustible air/fuel mixture to said at least one combustion chamber; and an output shaft receiving rotational torque impulses in response to the burning of the air/fuel mixture in said at least one combustion chamber comprising the steps of:
    detecting at least one rotational position of the output shaft to generate reference signals having a predetermined relationship to the at least one combustion chamber;
    detecting the rotation of the output shaft to generate velocity profile signals indicative of the rotational velocity of the output shaft for each torque impulse as a function of the rotational angle of the output shaft with respect to said reference signals;
    processing said profile signals to generate correction signals indicative of at least two different perturbations of the processed profile signals from signals indicative of a desired torque impulse profile, said at least two perturbations caused by deviations of at least two different operational parameters of the engine from desired values;
    detecting at least one other operational parameter of the engine to generate a parameter signal;
    processing said parameter and correction signals to generate a control signal effecting predetermined variations of the operation of the engine about said at least two operational parameters.

21. The method of claim 20 wherein the output shaft rotates through a predetermined angular interval for each torque impulse, said step of detecting the rotation of the output shaft to generate profile signals comprises:
    detecting the rotation of the output shaft to generate a predetermined number of angular increment signal indicative of a plurality of angular increments of output shaft rotation within each of said angular intervals; and
    storing the number of angular increment signals received after each of said reference signals to generate instantaneous angle signals indicative of the instantaneous angular position of the output shaft with respect to said reference signals;
    measuring the time duration between sequential angular increment signal and generating period signals indicative of the time required by the output shaft to rotate through each of said at least two angular increments, said period signals and corresponding angle signals are utilized to generate said profile signals.

22. The method of claim 21 wherein said step of processing said profile signals comprises the steps of:

differentiating said profile signals to generate an angle signal indicative of the instantaneous angle of the output shaft at which the torque impulse profile has an inflection point, the angle at which said inflection point occurs is characteristic of one of said at least two engine operating parameters; and comparing said angle signal with a reference angle signal to generate a correction signal having a value indicative of the difference between said angle signal and said reference signal for each torque impulse.

23. The method of claim 22 wherein said step of differentiating said profile correction signals comprises:

subtracting said sequentially generated period signals, one from the other, to generate difference signals having a value indicative of a change in rotational velocity of the output shaft;

detecting changes in said difference signals to generate a hold signal when a predetermined change is detected; and storing in response to said hold signal, the instantaneous angle signal corresponding to the rotational angle of the output shaft at the time said hold signal is generated.

24. The method of claim 23 wherein said step of detecting changes in said difference signals generates said hold signal when said predetermined change in said difference signals is a change in the polarity of said difference signals indicative of the difference signals passing through zero.

25. The method of claim 22 wherein said step of differentiating comprises the step of differentiating said profile signals and generating a phase angle signal indicative of the phase angle of each torque impulse with respect to said reference signals wherein said phase angle signal is said angle signal.

26. The method of claim 22 wherein said step of processing to generate correction signals further includes the steps of:

comparing the profile signals from at least two different torque impulses to generate difference signals indicative of a perturbation between the two different torque impulse profiles effected by the other of said at least two different operational parameters of the engine; and processing said difference signals to generate correction signals indicative of the perturbation between the two torque impulse profiles and characteristic of the other operational parameter of the engine.

27. The method of claim 26 wherein said step of comparing to generate difference signals generates difference signals indicative of the ratio of fuel to air of said air/fuel mixture received by said at least one combustion chamber and said step of processing to generate correction signals generates correction signals indicative of a change in the quantity of fuel delivered to the combustion chamber to effect a predetermined difference between the two torque impulse profiles.

28. The method of claim 27 wherein the engine has a plurality of combustion chambers, said step of comparing to generate difference signals compares the profile signals of sequential torque impulses generated by different combustion chambers and said difference signals are indicative of engine roughness.

29. The method of claim 27 wherein said engine has a plurality of combustion chambers, said step of comparing compares the profile signals of sequential torque impulses generated by the same combustion chambers.

30. The method of claim 20 wherein said step of processing to generate correction signals further includes the step of processing said profile signals to generate correction signals characteristic of a third operational parameter of the engine operative to perturbate each torque impulse in a way different from the other two operational parameters of the engine.

31. The method of claim 20 wherein the engine is a compression ignited engine, said step of processing to generate a control signals includes the steps of generating at least one control signal controlling the ratio of fuel to air of the air/fuel mixture delivered to the engine modified in response to the correction signal characteristic of the other of said at least two engine operating parameters and generating at least one other control signal controlling the time at which the air/fuel mixture is delivered to said at least one combustion chamber modified in response to the correction signal characteristic of said one operational parameter of the engine.

32. The method of claim 20 wherein the engine is a spark ignited engine having ignition means in said combustion chamber, said step of processing to generate control signals includes the step of generating at least one control signal controlling the ratio of fuel to air of said air/fuel mixture modified in response to the correction signal characteristic of the other of said at least two engine parameters, and generating at least one other control signal controlling the time at which said ignition means is energized to ignite the air/fuel mixture modified by the correction signal characteristic of said one operational parameter of the engine.

33. The method of claims 31 or 32 wherein said step of processing to generate said correction signals further includes the step of combining the correction signals characteristic of said at least two engine operating parameters to generate at least one correction signal variable as a function of said at least two engine operating parameters.

34. A fuel management control for an internal combustion engine having at least one combustion chamber wherein a combustible mixture is burned to generate a force which is applied to a movable member therein, comprising:

means for generating a reference signal indicative of at least one predetermined position of the movable member;

means for detecting the motion of the member and for generating velocity profile signals indicative of the substantially instantaneous velocity of the member in relation to said reference signal;

means for generating desired velocity profile signals indicative of the desired velocity profile of the movable member;

means responsive to said velocity profile signal for generating a correction signal indicative of the magnitude of the difference of at least two different deviations of said velocity profile signals; and combustible fuel mixture control means responsive to at least one other operational parameter of the engine and said correction signal to control the amount of combustible mixture delivered to the chamber to minimize the magnitude of the difference in the velocity profile signals from the desired velocity profile signals.

35. A method for controlling the operation of an internal combustion engine having at least one combustion chamber wherein a combustible mixture is burned to generate a force applied to a movable member thereof, the method comprising:

generating a reference signal indicative of at least one predetermined position of the movable member;

detecting the motion of the movable member for generating elocity profile signal indicative of the instantaneous velocity of the member in relation to said reference signal;

generating desired velocity profile signals indicative of the desired operation of the internal combustion engine;

generating a correction signal indicative of the magnitude of the difference of at least two deviations of the velocity profile signals from said desired velocity profile signal;

generating a parameter signal indicative of at least one other operational parameter of the engine; and combining said parameter and correction signals to generate control signals controlling the combustion of the combustible mixture delivered to the chamber to minimize the magnitude of the difference between the velocity profile signals and the desired velocity profile signals.

* * * * *